United States Patent [19]

Leake et al.

[11] Patent Number: 5,114,725

[45] Date of Patent: May 19, 1992

[54] METHOD FOR COLOR PRESERVATION IN CANNED GREEN VEGETABLES

[75] Inventors: Luther H. Leake, Arden Hills; Laurie K. Kirk, Minnetonka, both of Minn.

[73] Assignee: The Pillsbury Company, Minneapolis, Minn.

[21] Appl. No.: 643,407

[22] Filed: Jan. 18, 1991

[51] Int. Cl.$^5$ ............................................. A23L 1/272
[52] U.S. Cl. ..................................... 426/270; 426/74; 426/131; 426/101; 426/407
[58] Field of Search ................. 426/270, 74, 398, 540, 426/615, 131, 331, 401, 407

[56] References Cited

U.S. PATENT DOCUMENTS

| | | | |
|---|---|---|---|
| 2,875,071 | 2/1959 | Malecki | 99/186 |
| 2,906,628 | 9/1959 | Malecki | 99/186 |
| 2,976,157 | 3/1961 | Malecki | 99/186 |
| 4,104,410 | 8/1976 | Malecki | 426/399 |
| 4,473,591 | 9/1984 | Segner | 426/270 |
| 4,473,591 | 12/1982 | Segner | 426/270 |
| 4,478,860 | 10/1984 | Hekal | 426/270 |
| 4,615,924 | 10/1986 | Hekal | 426/270 |
| 4,840,808 | 9/1987 | Lee | 426/270 |
| 4,915,962 | 4/1990 | Howard | 426/648 |

OTHER PUBLICATIONS

Lopez 1981, a Complet course in Canning Book 1, Basic Information on Canning Eleventh Ediation p. 322, 323, 478, 479, 480, 481, 482, 483.
Fischbach et al., Stectrophotometric Story of the Green Color in in Okra, J. Assoc. Agrig. Chemists vol. 2. pp. 134–139 (1943).
Schanapel et al., Color Reversion in Proessed Vegetables, J. of Food Science vol. 30, pp. 317–324 (1965).
Heikal et al., Effect of Blanching and Storage on the Retention of Chlorophyll and Carotene in Green Beans, Arig. Research Review pp. 255–260 (1972).
Jones et al., Exr. Formation of Zu and Cu Commentes of Chlorophyl Derivatives in Vege. Tissue, J. Adic Food Chem, vol. 25, No. 1, pp. 149–153 (1977).
Von Elbe et al., Pigmet Composition and Color of Conventional and Vegri–Green Beans, J. Agric Food Chem, vol. 34, pp. 32–34 (1986).

Primary Examiner—Carolyn Paden
Attorney, Agent, or Firm—William J. Connors

[57] ABSTRACT

The present invention provides a method for producing a canned green vegetable product which utilizes a brine solution containing zinc and/or copper metal ions within the can with the vegetable. The cans are hermetically sealed with the vegetables and this brine solution therein and held at an elevated temperature prior to being subjected to either an extended sterilization event or multiple thermal treatments. The resulting canned green vegetable product has superior color and taste characteristics which can be maintained even under acidic conditions.

38 Claims, 1 Drawing Sheet

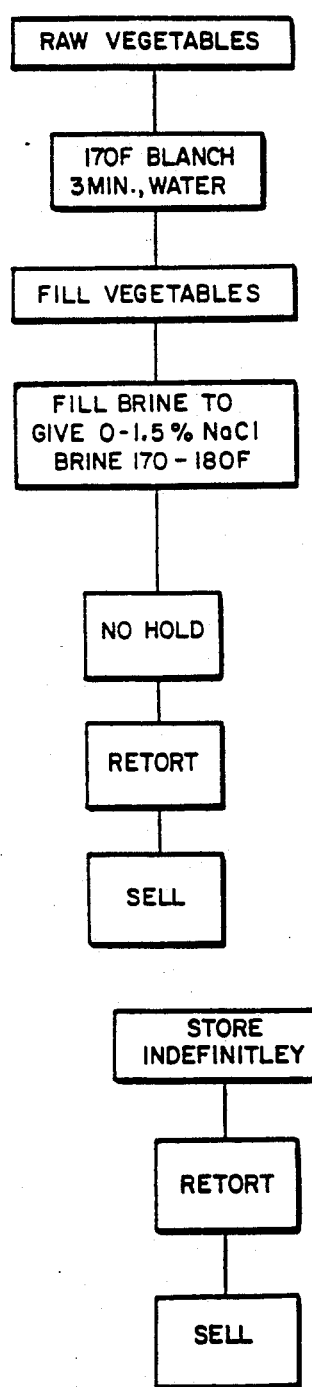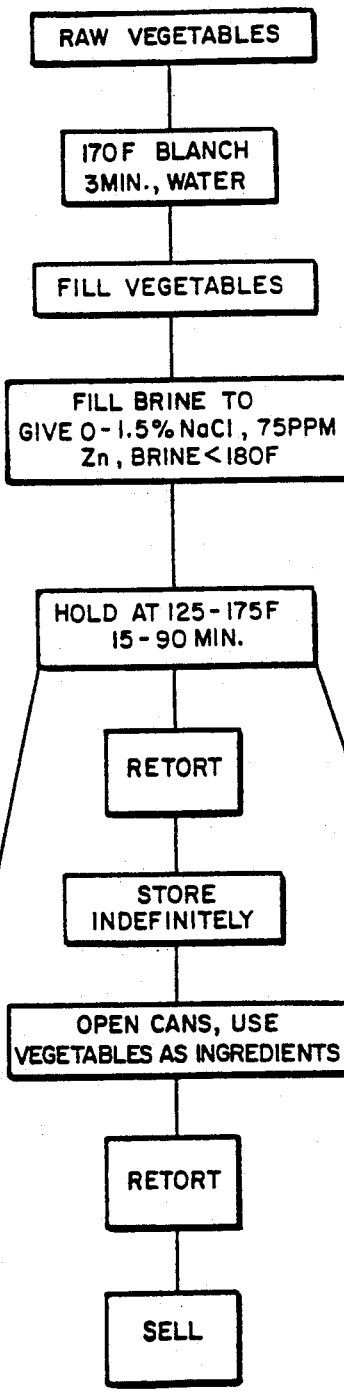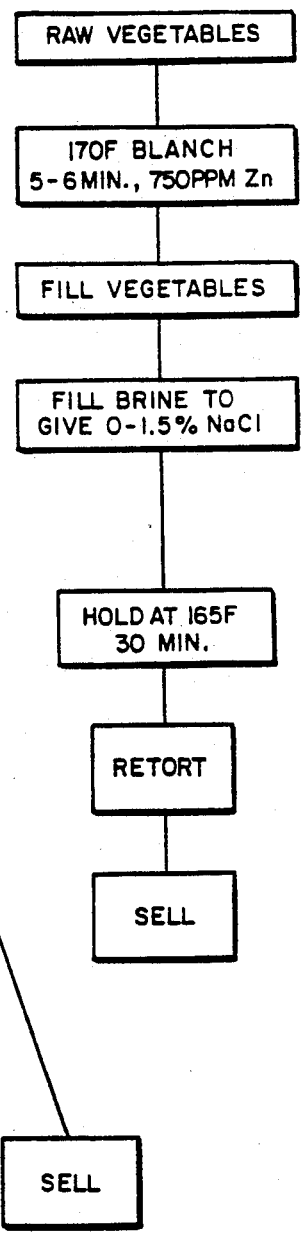

METHOD FOR COLOR PRESERVATION IN CANNED GREEN VEGETABLES

The present invention is directed to a process for the preservation and enhancement of the natural color of canned green vegetables which is adversely affected during conventional processing and storage.

Presently, conventional processing of canned green vegetables consists of washing the vegetables prior to blanching them for 2-5 minutes. In the case of green beans, blanching softens the beans slightly to facilitate filling them into cans. Blanching also facilitates the release of occluded gases which may produce off-flavors in some canned vegetables or add unwanted headspace to the can. The freshly blanched vegetables are then filled into cans and covered with a brine solution. The cans are next hermetically sealed prior to being commercially sterilized.

The primary problem with conventional processing is that it results in canned vegetables that have in large measure lost their desirable green color. Green vegetables display a yellow-olive color after canning by the conventional method. This phenomenon is a result of the chlorophyll present in the vegetables undergoing a chemical change to form the compound pheophytin. During thermal processing the pH of the brine decreases as a result of the production of organic acids by the vegetables. As the pH drops, two hydrogen ions replace the magnesium ion at the center of the chlorophyll structure yielding the yellow-olive pheophytin compound. However, the magnesium ion of chlorophyll can also be replaced by either a zinc or copper ion. The resulting green compound is referred to as either zinc or copper pheophytin, respectively. Advantageously, both the zinc and copper pheophytin complexes display a green coloration that is quite similar to that of chlorophyll.

Previous attempts to preserve the natural green color of canned vegetables have attacked the problem from basically two sides. First, since it is known that chlorophyll readily gives up its magnesium under acidic conditions, efforts have been made to maintain the canned vegetables under alkaline conditions. Second, processors have attempted to facilitate the formation of the green pheophytin complexes by supplying zinc, usually in the form of zinc chloride, to the vegetables at some point in the processing.

It is well known to incorporate alkaline reagents into either the blanch or brine liquids in which the vegetables are processed. For example, U.S. Pat. Nos. 1,908,795, 2,186,063, 2,189,774, 2,305,643 and 2,318,426 teach preserving the natural green color of canned green vegetables by incorporating calcium hydroxide, lo magnesium hydroxide, magnesium oxide and magnesium carbonate into either or both the blanch and brine solutions. It is equally well known to incorporate a water soluble alkaline compound in the lining of cans used for green vegetables. Compounds like magnesium hydroxide slowly diffuse from the lining into the brine and help maintain the pH at a level above that point at which the chlorophyll's magnesium ion might be displaced. Malecki (U.S. Pat. No. 2,875,071) discloses just such a procedure.

More recently, Hekal et al. (U.S. Pat. No. 4,478,860) discloses a process wherein vegetables that have been blanched in a highly alkaline solution are suspended in a brine with a carefully adjusted hydroxyl ion concentration. The vegetables are then packed into a can whose interior sidewalls have been coated with an alkaline earth compound.

The problems encountered with the alkaline treatment of vegetables are discussed by Malecki (U.S. Pat. No. 4,104,410). Specifically, alkaline treated vegetables have variable coloration depending upon the temperature and storage duration. Further, the vegetables canned in this manner are known to take on an ammoniacal (barn-yard) flavor. In addition to the off-flavors produced, the vegetables also develop textural problems after prolonged exposure to alkaline conditions. The combination of varied coloration, off-flavors and textural deficiencies ultimately result in the consumer questioning the quality of the product.

U.S. Pat. No. 4,104,410 itself discloses the elimination of the blanching process altogether citing it as the color robbing step in conventional green vegetable canning. Instead of blanching, 4,104,410 discloses maintaining the vegetables in an aerobic environment prior to subjecting the vegetables to a hot water wash. The wash temperature is calculated to be below the thermal injury point for the particular vegetable being processed and is always below conventional blanching temperatures.

It has long been known in the art to provide zinc and copper ions in the brine of canned green vegetables. An article entitled "Spectrophotometric Study of the Green Color in Okra," Association of Official Agricultural Chemists, vol. 26, 134-139 (1943) examined the practice of adding small quantities of zinc to the brine of canned okra. It was determined that the zinc had combined with pheophytin yielding a green compound which was responsible for the green color retention displayed by okra after thermal processing. An article entitled "Experimental Formation of Zinc and Copper Complexes of Chlorophyll Derivatives in Vegetable Tissue by Thermal Processing," Journal of Agricultural Food Chemistry, vol. 25, no. 1, 149-153 (1977) concluded that copper formed complexes with chlorophyll derivatives much more readily than did zinc.

Segner et al. (U.S. Pat. No. 4,473,591) discloses the variation of incorporating zinc and copper metal ions into the blanch water instead of the brine water. The immediate stabilization of color during the blanching step is cited as the benefit of processing canned green vegetables in this manner. It is also known to be beneficial for optimum green color retention to hold the cans for a 30 minute period at 165 F. after filling with brine.

This process has four major drawbacks. First, the vegetables produced using this process often have poor, nonuniform green color. Second, since the metal ion is added during blanching, a blancher must be dedicated to the process, limiting the flexibility of the production facility. Third, the precise concentration of the metal ion in the blanch liquid is extremely difficult to monitor and manage. Finally, this method presents the costly and problematic issue of disposal of the blancher liquid containing the metal ion. A permit is required for proper disposal of solutions of this type.

As can be seen from this examination of previous efforts to remedy the problem of discolored canned green vegetables, none have been wholly successful. In fact, with the exception of U.S. Pat. No. 4,473,591 none of these methods are in commercial use.

SUMMARY OF THE INVENTION

The natural color of canned green vegetables is preserved and enhanced by means of either multiple thermal treatments or an extended sterilization event thermal processing. The process comprises the steps of blanching the vegetables, filling the vegetables into cans, adding a brine solution containing metal ions selected from the group consisting of zinc and copper to the cans, hermetically sealing the cans, and holding the cans at an elevated temperature prior to subjecting the cans to either an extended sterilization event thermal process or multiple thermal treatments. The process makes possible the maintenance of the desirable aesthetic characteristics of canned green vegetables such as an improved, uniform green coloration even after prolonged storage. The process further makes possible the maintenance of a bright green color in acidified vegetables and mixtures thereof, a result that is not otherwise possible. The invention is applicable to green vegetables such as green beans, asparagus, spinach and the like.

BRIEF DESCRIPTION OF THE DRAWINGS

FIG. 1 is a flow diagram representing a typical process for processing and canning raw vegetables;

FIG. 2 is a flow diagram representing a process for processing and canning raw vegetables in accordance with the present invention; and FIG. 3 is a flow diagram representing a nontypical process for processing and canning raw vegetables.

DETAILED DESCRIPTION

The present invention may be fully appreciated by reference to the flow diagrams shown in FIGS. 1-3.

In the practice of the present invention, raw green vegetables are blanched in water under conventional conditions. The vegetables are then drained of the blanch liquid and filled into cans where a small aliquot of a concentrated zinc solution is added to the cans. The contents of the cans are then covered with a brine solution. Optionally, the brine solution may be heated to a temperature of between 125 F. and 175 F. to facilitate maintaining this temperature during the ensuing hold period. The overall zinc concentration in the can should be about at least 40 ppm, up to 75 ppm. Lesser zinc ion concentrations may produce some improvement in color preservation, but it has generally been found that color preservation and enhancement increases with increasing zinc ion concentrations. Optionally, a small aliquot of a concentrated copper solution may be added to the cans before the vegetables are covered with the brine solution. Copper is known to be more effective in preserving the color of green vegetables at lower ionic concentrations than are required for zinc to achieve the same effectiveness. Of course, aliquots of both a concentrated zinc and a concentrated copper solution could be added to the same can.

As an alternative to incorporation of the metal ion into the brine by means of the aliquot method, the ion may be introduced by means of a coating applied to the interior of the cans. Such a coating would leech either zinc or copper, or a combination of the two into the brine in the same concentrations as utilized in the aliquot method. It is important to note that 75 ppm is the current permissible zinc ion concentration as set by the FDA for canned green beans. There are not currently any FDA guidelines regarding permissible copper ion concentrations in canned green beans. However, copper may be added to food as a dietary supplement or to act as a synergist. It is believed that the addition of a copper ion solution to the canning of green vegetables would fall within at least one of the permissible uses. Specifically, copper could be added as a supplement in an effort to increase the nutritional value of canned green vegetables. The current Recommended Daily Allowances for zinc and copper are 15 mg and 2 mg, respectively (RDA, 9th Ed., 1980, National Research Council). Since diets in the United States may be marginal in both zinc and copper, and dietary requirements for zinc and copper are interdependent, the two metal ions could be used advantageously in the ratio of their RDA's. The exact zinc and copper ionic concentrations may of course be altered to conform to changes in FDA guidelines.

The cans are next hermetically sealed and held at an elevated temperature in the range of 125-175 F., preferably 165 F. It is important that the temperature not exceed 180 F. at this stage of the process. Optionally, the cans may be inverted or otherwise agitated at the outset of the hold period to facilitate complete diffusion of the metal ion throughout the can. The duration of the hold may range from 5-90 minutes, preferably at least 30-60 minutes.

After the hold period, the canned green vegetables are then subjected to a plurality of thermal treatments. The canned green vegetables may also undergo an initial extended sterilization event instead of being subjected to successive thermal treatments. The specific retort temperature and duration of the first of these thermal treatments is sufficient to render the canned green vegetables commercially sterile within recognized safety margins. Specific time and temperature parameters for the sterilization will of course be dictated by standard considerations such as can size and particular vegetable. For example, the temperature of the sterilization event for cut green beans packed in a #10 (603×700) can in a still retort would be easily in excess of 212 F., preferably 250 F. for at least 22 minutes.

The cans may be stored for an indefinite period of time after the first of said plurality of thermal treatments prior to being subjected to at least a second thermal treatment. Subsequent thermal treatments are solely for the purposes of enhancing the color of the canned green vegetables. Therefore, the specific duration and temperature of the subsequent thermal treatments may vary from those of the first thermal treatment which serves as a sterilization event. The specifics of the subsequent thermal treatments must be calculated for each particular vegetable in order to optimize the color enhancement. Choice of can size, particular metal ion or combination thereof, and metal ion concentration will figure significantly in the determination of the specific time and temperature parameters of the subsequent thermal treatments.

In the practice of a particular embodiment of the present invention which employs an initial extended sterilization event, again using cut green beans packed in a #10 (603×700) can in a still retort as an example, the canned green vegetable are subjected to temperatures easily in excess of 212 F., preferably 250 F. for at least 30-35 minutes. One skilled in the art will immediately appreciate that the cumulative effect of the multiple thermal treatments in the practice of all the embodiments of the present invention are significantly greater than is required for achieving mere commercial sterility. One will also note that the initial extended sterilization event embodiment receives in one thermal treatment at least the equivalent thermal exposure which the other embodiments receive cumulatively in the multiple treatments. The thermal exposure beyond that which is necessary for commercial sterility results in the improved aesthetic appearance of green vegetables canned in accordance with the present invention.

In the practice of one embodiment of the present invention, the canned green vegetables that have thus far been subjected to at least one sterilization event and have also been stored an indefinite period of time, are opened and the contents therein used as ingredients in vegetable mixtures. The vegetable mixtures are then packed into suitable containers and sterilized. The sterilization of the vegetable mixtures provides at least the second of said plurality of thermal treatments for the canned green vegetable constituents of the vegetable mixtures. In this embodiment, each thermal treatment is a sterilization event. The second sterilization event may be based on low acid or high acid thermal processing guidelines depending upon the nature of the particular vegetable mixture.

The color of the canned green vegetables has been found to become brighter and more uniform after the second sterilization event as compared to their appearance upon opening the cans after the storage period. This is true even of the acidified vegetable mixtures, a result which would have been impossible with conventional canning methods. While not intending to be bound by this theory, the cumulative effect of the thermal processes is believed to result in the enhancement of the color of green vegetables treated in accordance with the invention as compared with those which have been conventionally canned. In the case of the extended sterilization event processing, at least the equivalent of the cumulative thermal exposure of multiple thermal treatments is provided in one event.

In another embodiment of the present invention, the canned green vegetables may simply undergo at least a second thermal treatment in the same can within which they were initially sterilized. This second thermal treatment would follow an indefinite storage period. It has also been found that the aesthetic appearance of green vegetable that have had zinc or copper ions introduced during other steps in the canning process other than via the brine aliquot method also benefit from multiple thermal treatments. Introduction of the metal ion during the blanching step, for example, followed by multiple thermal treatments results in a dramatic improvement in the aesthetic appearance of the canned green vegetables when compared to an ion enriched vegetable that has only received a single thermal treatment.

All of the embodiments of the present invention produce canned green vegetables which display a green color that is superior both in uniformity and aesthetic appeal to the color displayed by conventionally canned green vegetables. Further, the canned green vegetables of the present invention are also free of the negative flavor side effects that accompany alkaline processing. Advantageously, all of the embodiments of the present invention are also free of the restraints that accompany a process in which the zinc or copper ion is incorporated into the blanch water. Because of the ease with which the metal ion concentration of the brine may be regulated via the addition of a concentrated aliquot, as opposed to regulating the blancher's metal ion concentration, the brine incorporation method is clearly superior on a commercial scale. One of the embodiments of the present invention has the added advantage of allowing vegetable processing plants to produce high quality vegetable mixtures from canned green vegetables that have been stored until a lull in plant activity makes it convenient to produce such mixtures.

What is claimed is:

1. A method for preserving and enhancing the color of canned green vegetables comprising:
   a) blanching said green vegetables;
   b) filling said blanched green vegetables into a container;
   c) covering said blanched green vegetables with a brine solution containing a metal ion selected from the group consisting of zinc and copper ions, within said container;
   d) hermetically sealing said container;
   e) holding said hermetically sealed container at an elevated temperature for a length of time; and
   f) subjecting said hermetically sealed container to at least a plurality of thermal treatments, the first of which is sufficient to provide commercial sterility.

2. The method of claim 1, wherein the metal ion is zinc.

3. The method of claim 1, wherein the metal ion is copper.

4. The method of claim 1, wherein said zinc and copper ions are used in combination.

5. The method of claim 1 or 2, wherein the resulting zinc ion concentration is at least about 40 ppm.

6. The method of claim 1 or 3, wherein the resulting copper ion concentration is sufficient to provide 2 mg of copper per serving of the green vegetables.

7. The method of claim 1, wherein said hermetically sealed container is held at least greater than 15 minutes, up to 90 minutes prior to being subjected to the first of said plurality of thermal treatments.

8. The method of claim 1 or 7, wherein said hermetically sealed container is held at an elevated temperature of between 125 F. and 175F.

9. The method of claim 1, wherein the processing temperature for each of said plurality of thermal treatments is in excess of about 212 F.

10. The method of claim 1, further comprising storing said hermetically sealed container after said holding step for an indefinite period of time between said plurality of thermal treatments.

11. A method for preserving and enhancing the color of canned green vegetables comprising:
   a) blanching said green vegetables;
   b) filling said blanched green vegetables into a container;
   c) covering said blanched green vegetables with a brine solution containing a metal ion selected from the group consisting of zinc and copper ions, within said container;
   d) hermetically sealing said container;
   e) holding said hermetically sealed container at an elevated temperature for a length of time;
   f) subjecting said hermetically sealed container to at least one sterilization event sufficient to provide commercial sterility; and
   g) using said sterilized green vegetables as an ingredient in a food item which is then sterilized during a subsequent said sterilization event.

12. The method of claim 11, wherein the metal ion is zinc.

13. The method of claim 11, wherein the metal ion is copper.

14. The method of claim 11, wherein said zinc and copper ions are used in combination.

15. The method of claim 11 or 12, wherein the resulting zinc ion concentration is at least about 40 ppm.

16. The method of claim 11 or 13, wherein the resulting copper ion concentration is sufficient to provide 2 mg of copper per serving of the green vegetables.

17. The method of claim 12, wherein said hermetically sealed container is held at least greater than 15 minutes, up to 90 minutes prior to being subjected to the first of said at least one sterilization events.

18. The method of claim 12 or 17, wherein said hermetically sealed container is held at an elevated temperature of between 125 F. and 175 F.

19. The method of claim 11, further comprising storing said sterilized hermetically sealed container an indefinite period of time between said at least one sterilization event and said subsequent sterilization event.

20. The method of claim 1 or 11, wherein said hermetically sealed container is exposed to temperatures in excess of about 212 F. for time periods significantly greater than is required for achieving commercial sterility for each particular type of green vegetable being processed.

21. The method of claim 11, wherein said food item in which said sterilized green vegetables are used as an ingredient is acidified below pH 4.6.

22. A method for preserving and enhancing the color of canned green vegetables, comprising:
   a) blanching said green vegetables;
   b) filling said blanched green vegetables into a container;
   c) covering said blanched green vegetables with a brine solution containing a metal ion selected from the group consisting of zinc and copper ions, within said container;
   d) hermetically sealing said container;
   e) holding said hermetically sealed container at an elevated temperature for a length of time; and
   f) sterilizing said hermetically sealed container for an extended period of time.

23. The method of claim 22, wherein the metal ion is zinc.

24. The method of claim 22, wherein the metal ion is copper.

25. The method of claim 22, wherein said zinc and copper ions are used in combination.

26. The method of claim 22 or 23, wherein the resulting zinc ion concentration is at least about 40 ppm.

27. The method of claim 22 or claim 24, wherein the resulting copper ion concentration is sufficient to provide two mg of copper per serving of the green vegetables.

28. The method of claim 22, wherein said hermetically sealed container is held at least greater than 15 minutes, up to 90 minutes prior to sterilizing.

29. The method of claim 22 or 28, wherein said hermetically sealed container is held at an elevated temperature between 125 F. and 175 F.

30. The method of claim 22, wherein the processing temperature for said extended period of time is in excess of 212 F.

31. The method of claim 22, wherein said hermetically sealed container is exposed to temperatures in excess of 212 F. for a time period significantly greater than is required for achieving commercial sterility for each particular type of green vegetable being processed, during said extended sterilization event.

32. The method of claim 1, 11, or 22, wherein said metal ions are made available to said green vegetables prior to hermetically sealing said container.

33. The method of claim 1, 11, or 22, wherein said metal ions are initially present in or on the lining of said container surface such that they migrate into said brine.

34. The method of claim 1, 11, or 22, wherein the brine solution is sodium free.

35. The method of claim 1, 11, or 22, wherein the brine is heated.

36. The method of claim 1, 11, or 22, wherein said container is inverted or otherwise agitated to facilitate complete diffusion of the metal ion after being hermetically sealed.

37. The product of the method of claim 1, 11, or 22.

38. The method of claim 1, wherein the cumulative effect of said plurality of thermal treatments is significantly greater than is required for achieving commercial sterility.

* * * * *